United States Patent
Roza

[15] 3,645,055
[45] Feb. 29, 1972

[54] SCREW ANCHOR
[72] Inventor: Kenneth Ralph Roza, Chicago, Ill.
[73] Assignee: Joslyn Mfg. and Supply Co., Chicago, Ill.
[22] Filed: Dec. 28, 1970
[21] Appl. No.: 101,623

[52] U.S. Cl. .......................................................52/157
[51] Int. Cl. ....................................................E02d 5/74
[58] Field of Search ..........................52/157, 165; 24/115 B

[56] References Cited

UNITED STATES PATENTS

| | | | |
|---|---|---|---|
| 839,822 | 1/1907 | Dunnington | 52/157 |
| 1,849,268 | 3/1932 | Birkenmaier | 52/157 |
| 3,016,117 | 1/1962 | Petersen | 52/157 |

FOREIGN PATENTS OR APPLICATIONS

| | | | |
|---|---|---|---|
| 686,340 | 5/1964 | Canada | 52/157 |
| 869,531 | 5/1961 | Great Britain | 52/157 |

Primary Examiner—Donald A. Griffin
Attorney—Mason, Kolehamainen, Rathburn & Wyss

[57] ABSTRACT

A screw anchor for use in securing a guy wire to the ground includes a shaft with a shank portion having a pointed end for insertion into the ground and a rod extending from the other end of the shank portion to which the guy wire can be attached. Affixed to the shank portion is at least one generally helical cutting blade with a spiral cutting edge so that an obstructing force exerts a constant torsional moment on the shaft of the screw anchor regardless of the position at which the force strikes the cutting edge as the screw anchor is installed into the ground.

6 Claims, 4 Drawing Figures

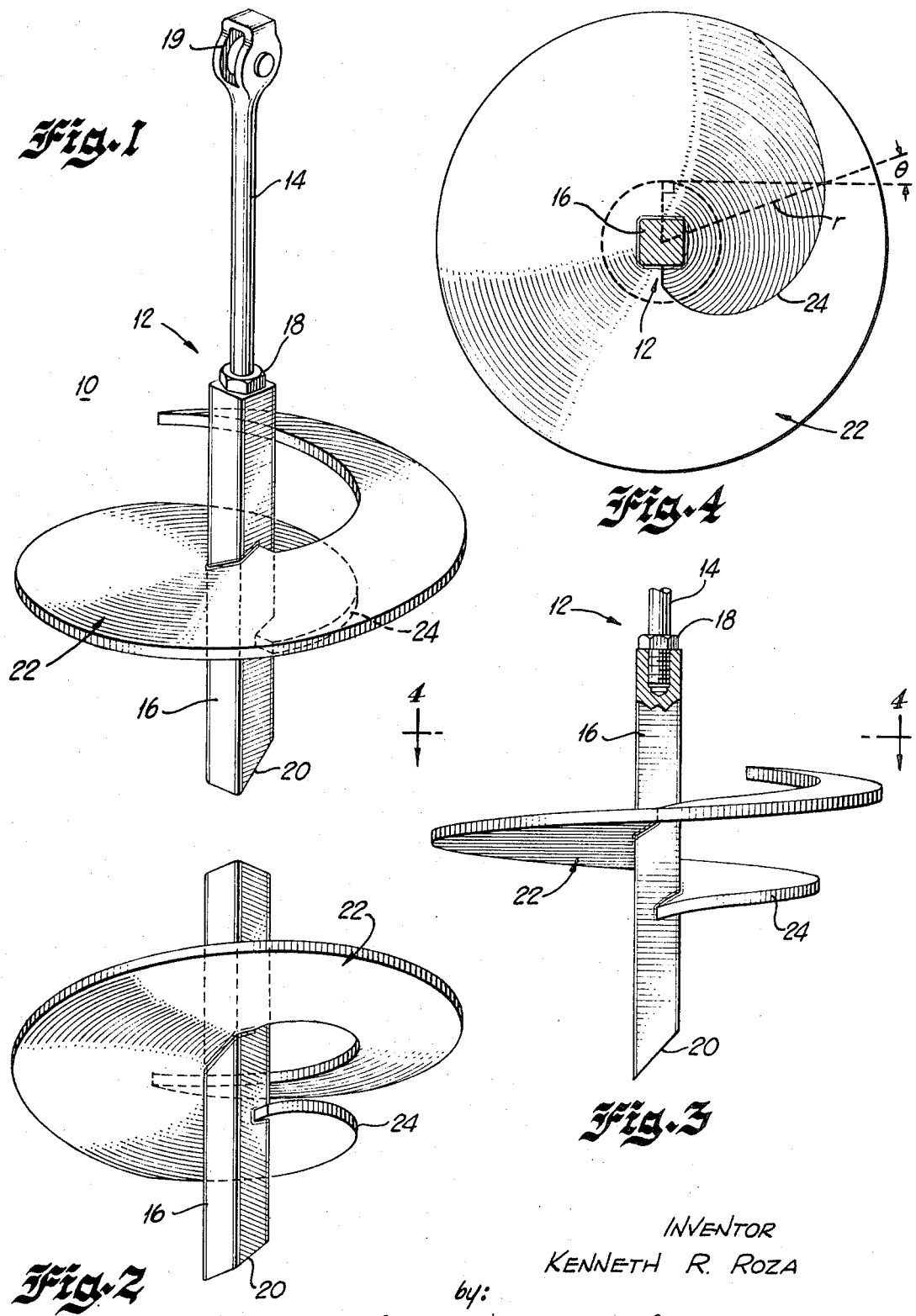

SCREW ANCHOR

The present invention relates to screw anchors, and more particularly, to an improved cutting blade to facilitate the installation of a screw anchor into the ground.

Screw anchors are employed for securing a guy wire or the like to the ground. The screw anchor normally includes a shaft to which is forged or welded a cutting blade which enables the insertion of the anchor into the ground when an installing torque is applied to the shaft either manually or by a power-driving tool. Commercially available screw anchors have a helical cutting blade with a sharpened cutting edge on the helix to facilitate the installation of the screw anchor into the ground. The cutting blade is affixed to the shaft of the screw anchor in such a manner that the cutting edge of the blade is perpendicular to the shaft so that a force caused by an obstruction or the like exerts a torsional moment on the installing shaft in a linear relationship to the position of the obstruction along the cutting edge. In addition, as the screw anchor is being installed, the perpendicular cutting edge only tends to force the displaced soil vertically and a rather large installing torque is necessary.

Accordingly, one object of the present invention is to provide a new and improved screw anchor.

Another object is to provide a new and improved cutting blade for a screw anchor to facilitate the installation of the screw anchor into the ground.

In accordance with these and many other objects, an embodiment of the present invention comprises a screw anchor having a shaft with a shank portion that is of any suitable shape, such as generally square. One end of the shank portion is formed into a point, and the other end of the shank portion receives a rod to which a guy wire or the like can be attached. A helical cutting blade is welded or forged to the shank portion and has a spiral cutting edge so that an obstructing force exerts a constant torsional moment on the shaft during installation of the anchor regardless of the position at which the obstructing force strikes the cutting edge.

Many other objects and advantages of the present invention will become apparent from considering the following detailed description in conjunction with the drawings in which:

FIG. 1 is a perspective view of the screw anchor embodying the present invention;

FIG. 2 is a perspective view of the shank portion and cutting blade of the screw anchor shown in FIG. 1;

FIG. 3 is a side elevational view of the screw anchor shown in FIG. 1 with a fragmentary portion shown in cross-sectional detail; and FIG. 4 is a top view of the portion of the screw anchor shown in FIG. 2.

Referring now more specifically to FIG. 1 of the drawings, therein is illustrated a screw anchor which is indicated generally as 10 and which embodies the present invention. The screw anchor 10 includes a shaft 12 having a rod portion 14 which is secured to the top of a shank portion 16 by means of a hexnut 18 and which has an eyelet 19 to which a guy wire can be connected. Although the shank portion 16 is shown as generally square-shaped, the shank portion 16 can be of any suitable construction such as round in cross section. The other end of the shank portion 16 is formed into a point 20 which aids the anchor around rocks and other obstructions during installations into the ground.

Affixed to the shank portion 16 is a helical cutting blade 22. The cutting blade 22 shown in FIGS. 1-4 of the drawings is in the form of a right-hand helix so that as a clockwise force is applied to the shaft 12, the screw anchor 10 is installed into the ground. A left-hand helical cutting blade (not shown) similarly can be affixed to the shaft 12 so that the screw anchor 10 is installed upon the exertion of a counterclockwise force on the shaft 12.

The cutting blade 22 has a leading or cutting edge 24 which, as can be more readily seen in FIG. 4 of the drawings, is of a generally spiral configuration. Since the cutting edge 24 is generally spiral and not perpendicular to the shank portion 16 of the screw anchor 10, an obstruction force caused by a rock or the like during the installation of the screw anchor 10 exerts a constant torsional moment on the shank portion 16 regardless of the position of the force along the cutting edge 24.

If the cutting edge 24 were substantially perpendicular to the shank portion 16, the torsional moment on the shank portion 16 caused by the obstructing force along the cutting edge 24 would be directly proportional to the position of the force along the cutting edge 24. Moreover, with the cutting edge 24 perpendicular to the shank portion 16, the helical shape of the blade 22 has a tendency to collapse or close upon encountering an obstructing force. However, the spiral shape of the cutting edge 24 enables the torsional moment on the shank portion 16 to be constant regardless of the position of the obstruction causing the force along the cutting edge 24 and tends to lessen the collapsing or closing of the helical-shaped blade 22.

The torsional moment M exerted by a given obstructing force F on the shank portion 16 is equal to $Fr \sin \theta$ wherein as illustrated in FIG. 4 of the drawings, $r$ is the distance of a radial line drawn from the axis of the shaft 12 to a point on the cutting edge 24 at which the force is applied, and $\theta$ is the angle formed by the radial line and a line drawn through the point on the cutting edge 24 and tangent to a circle having its center on the axis of the shaft 12. Since the cutting edge 24 is shaped to maintain $r \sin \theta$ at a constant value regardless of the position on the cutting edge 24 to which the radial line is drawn, the torsional moment on the shaft 12 is substantially constant. Therefore, unlike commercially available screw anchors, a given obstructing force applied anywhere along the cutting edge 24 exerts a constant torsional moment on the shaft 12.

In addition to the exertion of a constant torsional moment on the shaft 12, the spiral-shaped cutting edge 24 tends to push any movable obstruction out of the path of the cutting blade 22 during installation of the screw anchor 10. If the obstruction is immovable, the helical shape of the cutting blade 22 tends to deflect off the obstruction so that installation of the anchor 10 is not hindered. Furthermore, the required installing torque to be exerted on the shaft 12 during installation is less than in commercially available anchors, for the cutting edge 24 not only tends to move the soil vertically during installation, but forces the soil to move radially away from the shaft 12 so that the screw anchor 10 is more easily installed into the ground.

Although the present invention has been described by reference to only a single embodiment thereof, it will be apparent that numerous other modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. A screw anchor used for securing a guy wire to the ground comprising:
    a shaft with an axis along its length,
    and at least one helical cutting blade affixed to said shaft, said cutting blade having a generally spiral cutting edge, a substantial portion of which edge is defined by a curve formed in such a manner that the value of $r \sin \theta$ is constant, wherein $r$ is the distance of a radial line extending perpendicular from said axis to a point on said curve, and $\theta$ is the angle formed between said radial line and a line extending through said point tangent to a circle having its center on said axis and having its plane perpendicular to said axis and passing through said point.

2. A screw anchor as set forth in claim 1, wherein said shaft has a generally square shank portion to which the cutting blade is affixed.

3. A screw anchor as set forth in claim 2, wherein said shaft includes a rod attached to said shank portion to which the guy wire is connected.

4. A screw anchor as set forth in claim 1, wherein said cutting blade is welded to said shaft.

5. A screw anchor as set forth in claim 1, wherein said cutting blade is forged to said shaft.

6. A screw anchor used for securing a guy wire to the ground comprising:
a shaft having an axis,
and a helical cutting blade attached to said shaft, said cutting blade having a cutting edge shaped so that the value of $r \sin \theta$ is constant, wherein $r$ is the distance of a radial line drawn from said axis to a point on said cutting edge and $\theta$ is the angle formed by said radial line and a line drawn through said point and tangent to a circle having its center on said axis.

* * * * *